(12) United States Patent
Chang

(10) Patent No.: US 12,060,700 B2
(45) Date of Patent: Aug. 13, 2024

(54) CONNECTOR ASSEMBLY FOR CONNECTING VALVE SEAT WITH OUTLET PIPE AND FAUCET HAVING THE SAME

(71) Applicant: Globe Union Industrial Corp., Taichung (TW)

(72) Inventor: Jih-Tung Chang, Taichung (TW)

(73) Assignee: Globe Union Industrial Corp., Taichung (TW)

( * ) Notice: Subject to any disclaimer, the term of this patent is extended or adjusted under 35 U.S.C. 154(b) by 0 days.

(21) Appl. No.: 18/187,859

(22) Filed: Mar. 22, 2023

(65) Prior Publication Data

US 2024/0052612 A1   Feb. 15, 2024

(30) Foreign Application Priority Data

Aug. 11, 2022   (CN) .......................... 202222113908.6

(51) Int. Cl.
| | | |
|---|---|---|
| *F16K 27/00* | (2006.01) | |
| *E03C 1/04* | (2006.01) | |
| *F16K 11/00* | (2006.01) | |

(52) U.S. Cl.
CPC .......... *E03C 1/0404* (2013.01); *F16K 19/006* (2013.01); *F16K 27/00* (2013.01); *E03C 2201/30* (2013.01); *Y10T 137/87579* (2015.04)

(58) Field of Classification Search
USPC ................................................ 137/603, 801
See application file for complete search history.

(56) References Cited

U.S. PATENT DOCUMENTS

| | | | | |
|---|---|---|---|---|
| 4,592,388 A | * | 6/1986 | Wilcox ................. | F16L 37/008 285/276 |
| 5,669,595 A | * | 9/1997 | Bytheway ............... | F16L 37/38 137/322 |
| 8,302,620 B2 | * | 11/2012 | Lin ........................... | E03C 1/04 285/376 |
| 8,714,197 B2 | * | 5/2014 | Tzeng ................... | E03C 1/0403 4/678 |
| 8,925,572 B2 | * | 1/2015 | Shih ......................... | E03C 1/04 4/677 |
| 9,416,521 B2 | * | 8/2016 | Schurle ..................... | E03C 1/04 |

(Continued)

FOREIGN PATENT DOCUMENTS

| | | |
|---|---|---|
| CN | 203384565 U | 1/2014 |
| CN | 211082944 U | 7/2020 |

*Primary Examiner* — John Bastianelli
(74) *Attorney, Agent, or Firm* — Best & Flanagan LLP

(57) ABSTRACT

A connector assembly for connecting a valve seat with an outlet pipe and a faucet having the same are provided. The valve seat includes an outlet channel provided with an insertion hole and a first axial connection portion arranged at an outer cylindrical wall thereof. The first axial connection portion is located below the insertion hole. The outlet pipe includes an inlet end provided with a mounting portion and a second axial connection portion arranged at an outer surface of the outlet pipe and located close to the mounting portion. The second axial connection portion is detachably mounted into the first axial connection portion from bottom up to form a rotation point. By the outlet pipe rotated around the rotation point, the mounting portion is forced to be mounted and positioned inside the insertion hole of the valve seat firmly with sealing effect.

10 Claims, 9 Drawing Sheets

(56) References Cited

U.S. PATENT DOCUMENTS

2014/0150896 A1* 6/2014 Guan ................... F16K 19/006
  137/315.01
2016/0376775 A1* 12/2016 Tasserit ................ E03C 1/0403
  137/801
2019/0376608 A1* 12/2019 Tsuruda ............... F16K 19/006

* cited by examiner

CONNECTOR ASSEMBLY FOR CONNECTING VALVE SEAT WITH OUTLET PIPE AND FAUCET HAVING THE SAME

BACKGROUND OF THE INVENTION

The present relates to a faucet, especially to a connector assembly for connecting a valve seat with an outlet pipe and a faucet having the same.

PRIOR ART

A conventional faucet integrally formed by metal materials such as copper has many shortcomings. In order to overcome these shortcomings, a faucet which includes both a valve seat and an outlet pipe made of plastic, used as water passing parts and mounted in a faucet housing is applied widely. For example, please refer to Chinese granted utility model Pub. No. CN 203384565 U. A fixing structure for an outlet pipe joint and an outlet pipe is provided. The outlet pipe joint includes a bend having one end fitted and connected with the outlet pipe, and the other end fitted and connected with a joint of a control valve assembly. A positioning portion in a form of a rib is disposed on the bend while a recess is arranged at a support member. Thus the bend is fixed by the positioning portion being mounted and positioned in the recess.

Although the outlet pipe in the above prior art can be fixed to a certain degree by a simple design of the positioning portion of the bend being mounted with and positioned by the recess of the support member, there are still some disadvantages. For example, the common valve seat needs to be designed into two-piece type, the joint of the control valve assembly and the support member. Otherwise, the valve seat and the outlet pipe are unable to be assembled.

Moreover, during assembly process, the joint of the control valve assembly is first mounted into the faucet housing through an opening on top of the faucet housing. Then the outlet pipe is placed into the faucet housing through an opening of a spout and the bend connected with the outlet pipe is inserted and positioned in the control valve assembly. Next the control valve assembly is installed. The support member is mounted into the faucet housing through an opening on bottom of the faucet housing and the recess on the support member is used to mount and position the positioning portion of the bend. Now the assembly of the support and the bend is completed. The joint of the control valve assembly and the support member are assembled at different stages. The assembly process can't be completed once the joint of the control valve assembly and the support member are integrated into one part. Each of the two components need to make its own mold separately. Thus not only cost of mold-making is increased, assembly cost is also raised due to one more assembly process.

Furthermore, there is no positioning-related design disposed on a circumference of the bend. Thus it is difficult to ensure position accuracy of the bend after being mounted to the joint of the control valve assembly. It should be easily understood that the assembly process is unable to be completed smoothly once the recess is aligned with the positioning portion of the bend during assembling of the support member.

Refer to Chinese granted utility model Pub. No. CN 211082944 U, a water outlet assembly of a faucet valve seat is provided. The water outlet assembly mainly includes a sleeve mounted to a mounting hole of a valve seat for fitting and positioning an outlet pipe. By the design of a plurality of insertion holes of the sleeves with different extending angles, users can choose a suitable sleeve for mounting and positioning the outlet pipe to meet requirements for faucets with different shapes. An outer surface of the sleeve is provided with two protruding blocks which are used for being mounted into two mounting slots on an inner surface of the mounting hole to make positioning therebetween more stable.

In the above water outlet structure of the faucet valve seat, an additional sleeve is required so that one more assembly process of the sleeve is required and assembly cost is increased. Moreover, there is no positioning or limiting structure formed between the sleeve and the outlet pipe in the circumferential direction and the axial direction of water flow. Thereby the structure is unable to be assembled fast and accurately and the completed assembly is not secured, may get loosening or become wobbly. Although the sleeve can be provided with protruding blocks mounted in and engaged with the recess of the valve seat for positioning, the positioning only works in the circumferential direction, without effects on positioning or limiting in the direction of water flow. Thereby the water outlet assembly may still have loosening or wobbling under action of the water flow. The above loosening or wobbling not only makes noise, more seriously or after a long run, sealing structure or sealing effect may be damaged or affected so that water leakage is easy to occur.

SUMMARY OF THE INVENTION

Therefore, it is a primary object of the present invention to provide a connector assembly for connecting a valve seat with an outlet pipe, which has simple structure and fewer components required to achieve quick and easy assembly with good sealing effect. Moreover, not only cost of manufacturing and moldmaking is dramatically reduced, assembly efficiency is also increased. Assembly quality is guaranteed.

It is another object of the present invention to provide a faucet which is assembled easily by the design of the connector assembly for connecting a valve seat with an outlet pipe.

In order to achieve the above objects, a connector assembly for connecting a valve seat with an outlet pipe according to the present invention includes a valve seat and an outlet pipe. The features of the connector assembly are as the followings.

The valve seat includes an outlet channel formed therein and a first axial connection portion. The outlet channel is provided with an insertion hole disposed on a discharge end of the outlet channel while the first axial connection portion is formed on an outer cylindrical wall of the valve seat and located below the insertion hole.

The outlet pipe is composed of an inlet end, an outlet end, a mounting portion disposed on the inlet end, and a second axial connection portion which is arranged at an outer surface of the outlet pipe, located below the inlet end and close to the mounting portion. The second axial connection portion is detachably mounted into the first axial connection portion from bottom up to form a rotation point. By the outlet pipe rotated around the rotation point, the mounting portion is forced to be mounted and positioned inside the insertion hole of the valve seat firmly with sealing effect.

A faucet according to the present invention includes the valve seat, the outlet pipe, a faucet housing, a valve core, a control handle, and a water supply pipe set. The faucet housing consists of a main body and a spout respectively provided with a first chamber and a second chamber for mounting the valve seat and the outlet pipe therein correspondingly. The valve seat further includes a cold-water inlet channel and a hot-water inlet channel. The valve core is mounted and positioned on an upper part of the valve seat while a ratio of cold water and hot water respectively coming from the cold-water inlet channel and the hot-water inlet channel and flowing into the valve core is controlled by operation of the control handle. The control handle also controls on and off of a mixed water flow which is formed by the hot and cold water and flowing into the outlet channel. As to the water supply pipe set, it includes a cold-water inlet tube and a hot-water inlet tube respectively connected and communicating with the cold-water inlet channel and the hot-water inlet channel.

By the special structural design, the present connector assembly for connecting the valve seat with the outlet pipe can be used, without in combination with other component. Thereby the whole structure is simple, fewer components is required, and cost of manufacturing and moldmaking is reduced significantly. The structural design of the outlet pipe being mounted and positioned after rotation can simplify assembly process and reduce assembly steps required for the outlet pipe and the valve seat. The assembly efficiency is further improved. The design of the guiding flange of the valve seat combined with the rim surface of the outlet pipe allows the mounting portion of the outlet pipe able to be guided and mounted into the insertion hole smoothly. Thereby smoothness of the assembly process and sealing effect after assembly are balanced. By the design of limitation on horizontal movement of the second axial connection portion after being mounted to the first axial connection portion of the valve seat, the mounting portion can be mounted into the insertion hole accurately and quickly to ensure assembly efficiency and quality. The structural design of the mounting portion being mounted into the insertion hole after rotation of the outlet pipe allows the mounting portion to provide resistance to loosening or slipping and maintain good sealing effect for a long term even subjected to water pressure. Thereby the loosening of the components or water leakage in use can be avoided. The special design of assembly structure and operation between the valve seat and the outlet pipe ensures the use of a single piece of the valve seat. There is no need to use a two-piece type valve seat. Thereby cost of manufacturing and moldmaking for the valve seat will not be increased and corresponding assembly process derived can be avoided.

DETAILED DESCRIPTION OF CERTAIN EMBODIMENTS

Figure 1:
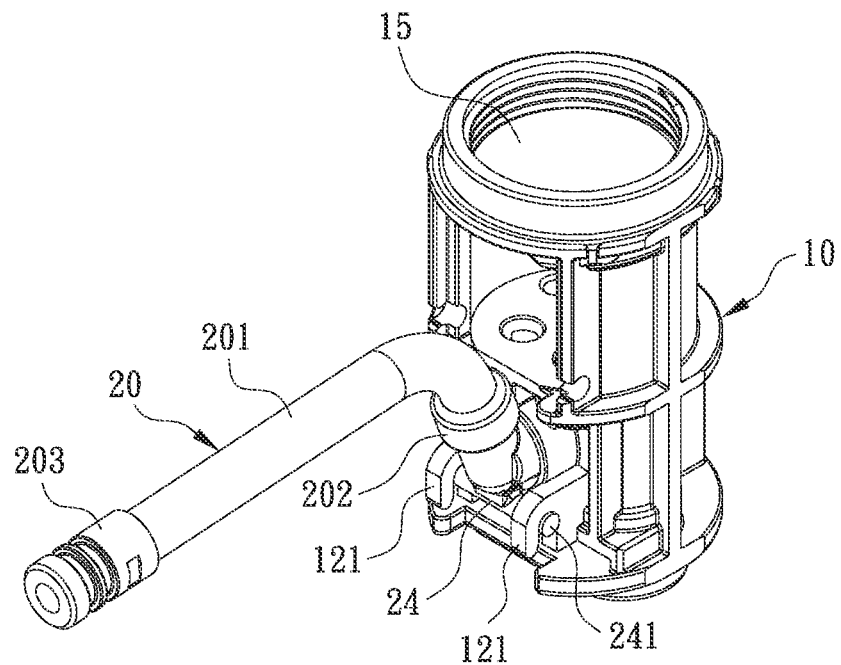
FIG. 1 is a perspective view of an embodiment having a valve seat connected with an outlet pipe according to the present invention.

Please refer to the following embodiments together with the related figures.

As shown in FIG. 1-4, a first embodiment of a connector assembly for connecting a valve seat with an outlet pipe according to the present invention includes a valve seat 10 and an outlet pipe 20.

The valve seat 10 consists of an outlet channel 11 formed therein and a first axial connection portion 12. The outlet channel 11 is provided with an insertion hole 111 formed at a discharge end of the outlet channel 11 and the first axial connection portion 12 is formed on an outer cylindrical wall of the valve seat 10 and located below the insertion hole 111.

Figure 5:
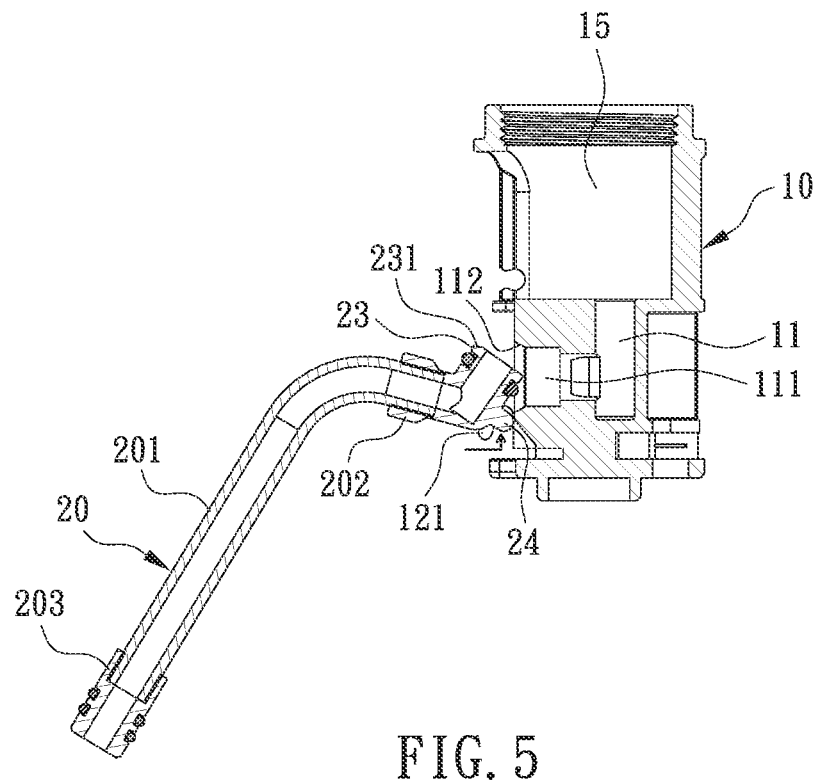
FIG. 5 is a schematic drawing showing an embodiment in which an outlet pipe is mounted to a valve seat and a rotation point is formed according to the present invention.
Figure 6:
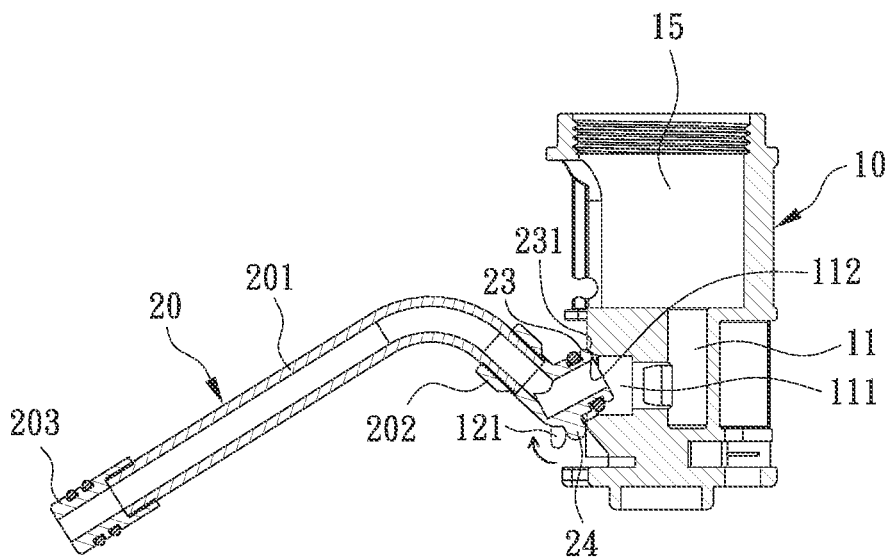
FIG. 6 is a schematic drawing showing an embodiment in which an outlet pipe on a valve seat is rotated so that a mounting portion of the outlet pipe is mounted into an insertion hole of the valve seat according to the present invention.

The outlet pipe 20 is composed of an inlet end 21, an outlet end 22, a mounting portion 23 disposed on the inlet end 21, a second axial connection portion 24 which is arranged at an outer surface of the outlet pipe 20, located below the inlet end 21 and close to the mounting portion 23. As shown in FIG. 5, the second axial connection portion 24 is detachably mounted into the first axial connection portion 12 from bottom up to form a rotation point. By the outlet pipe 20 being rotated around the rotation point, the mounting portion 23 is forced to be mounted and positioned inside the insertion hole 111 of the valve seat 10 with sealing effect, as shown in FIG. 6. During rotation of the outlet pipe 20, a rotation axis of the outlet pipe 20 is automatically moved vertically for fine adjustment along with mounting of the mounting portion 23 into the insertion hole 111 due to a force of interaction generated therebetween.

In this embodiment, a guiding flange 112 is mounted to an outer edge of the insertion hole 111 and extending outward while a rim surface 231 is formed on the outermost area of a rotation trace at an outer side of the mounting portion 23 of the outlet pipe 20. The above design ensures the mounting portion 23 can be guided and mounted into the insertion hole 111 more smoothly by the rim surface 231 being moved along the guiding flange 112. Both the rim surface 231 and the guiding flange 112 can be designed into geometric shapes which help smooth guidance and sliding movement such as a ramp or curved surface.

Figure 2:
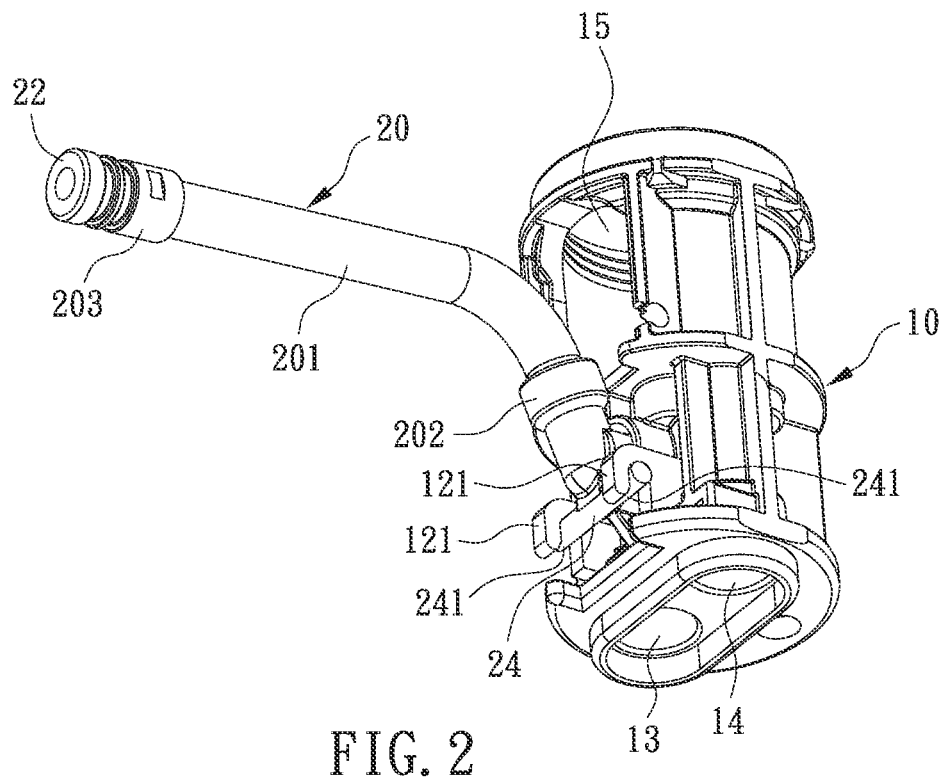
FIG. 2 is another perspective view of an embodiment having a valve seat connected with an outlet pipe according to the present invention.
Figure 3:
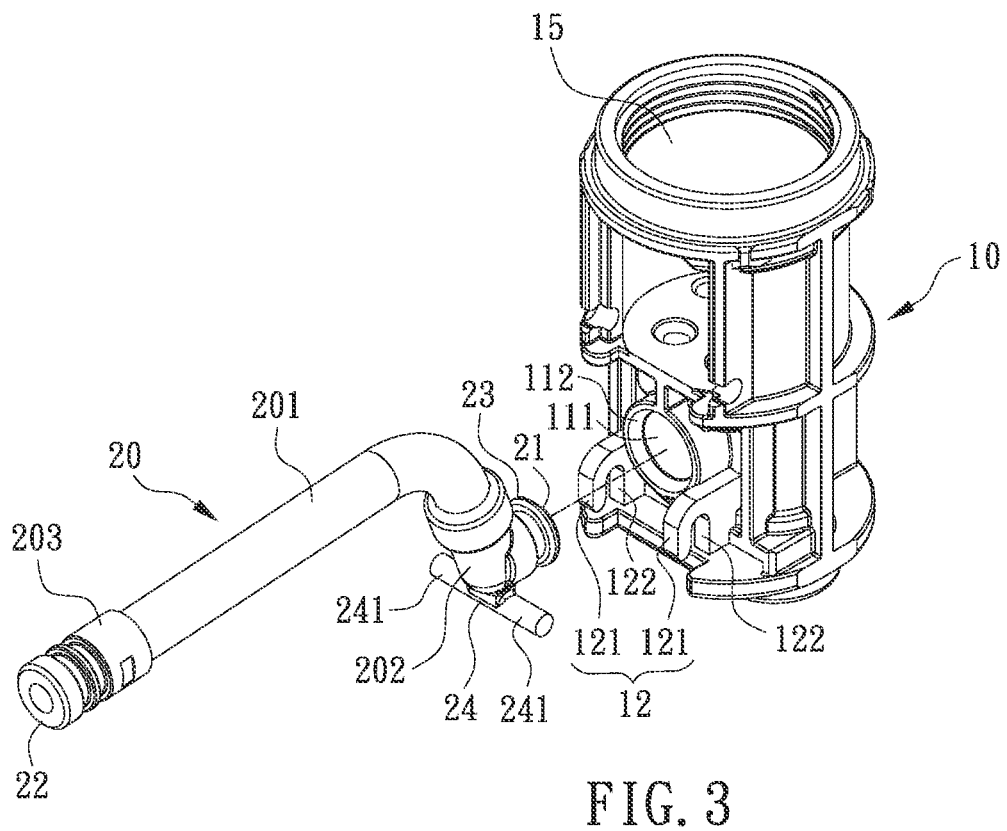
FIG. 3 is an exploded view of an embodiment having a valve seat and an outlet pipe according to the present invention.
Figure 4:
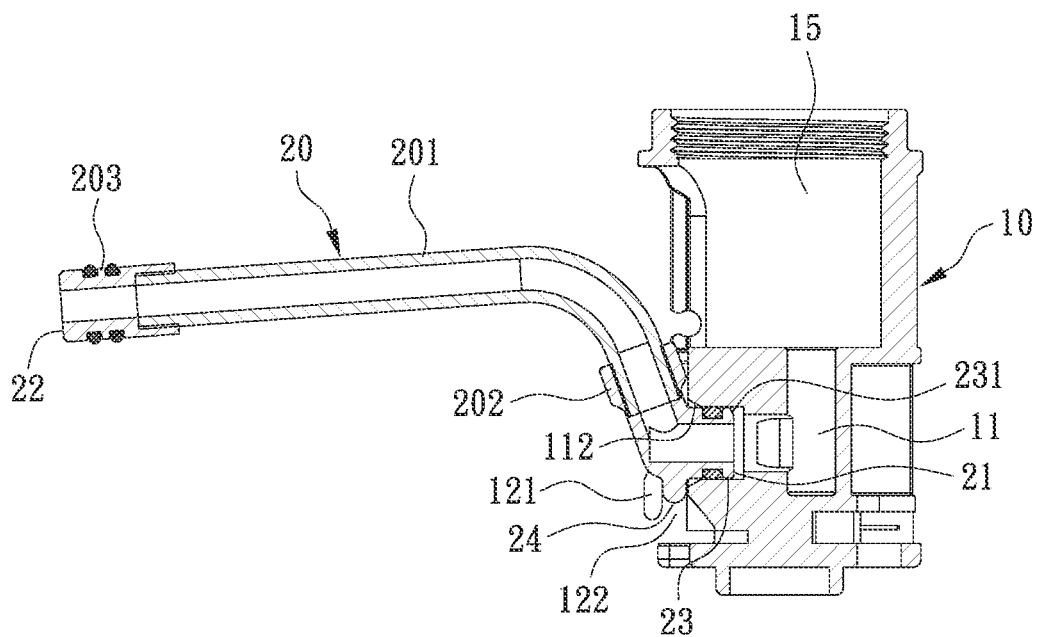
FIG. 4 is a sectional view of an embodiment cut along a long axis of an outlet pipe according to the present invention.

In this embodiment, refer to FIG. 3, the first axial connection portion 12 consists of two axial bases 121 arranged adjacent to the insertion hole 111 symmetrically with the insertion hole 111 located therebetween and two axial slots 122 each of which is extending vertically and disposed on the corresponding axial base 121. The second axial connection portion 24 is in a form of a shaft and provided with a mounting segment 241 which is disposed on each of two ends of the second axial connection portion 24 and able to be mounted into the corresponding axial slot 122 from bottom up to form the rotation point, as shown in FIG. 2.

In this embodiment, the outlet pipe 20 further includes an outlet hose 201, and an inlet joint 202 and an outlet joint 203 which are fixed and connected with two ends of the outlet hose 201 correspondingly. Both the mounting portion 23 and the second axial connection portion 24 are integrally formed on the inlet joint 202.

Figure 7:
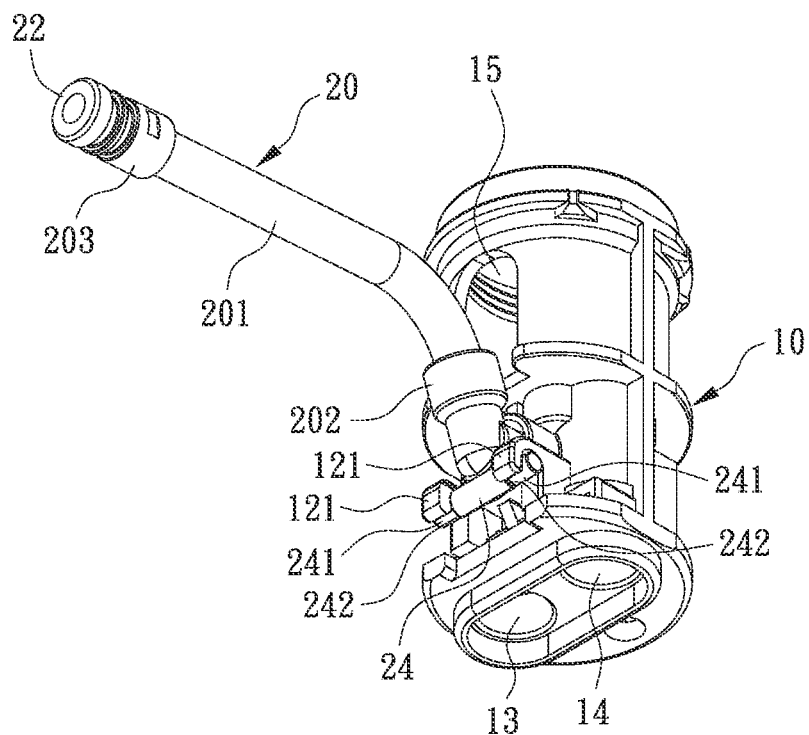
FIG. 7 a perspective view of another embodiment having a valve seat connected with an outlet pipe according to the present invention.
Figure 8:
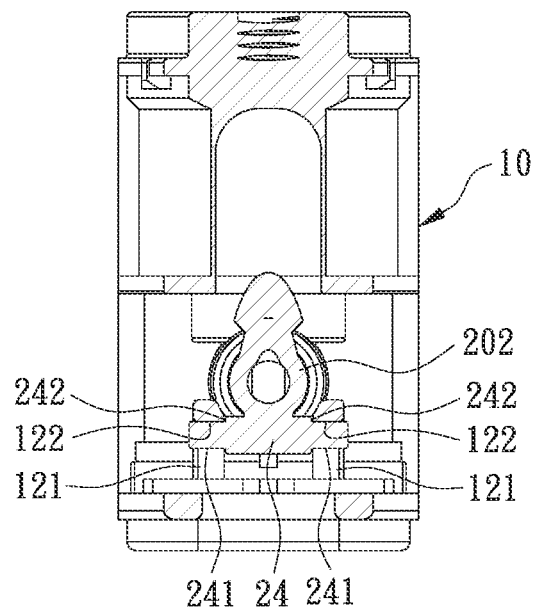
FIG. 8 is sectional view of another embodiment cut along a long axis of mounting segments according to the present invention.

As shown in FIG. 7 and FIG. 8, another embodiment is provided. This embodiment is about the same as the above embodiment and the two embodiments are different in that the second axial connection portion 24 of this embodiment further includes a stopping flange 242 arranged adjacent to an inner side of the mounting segment 241 for abutting against an inner wall surface of the axial base 121 to limit horizontal movement of the second axial connection portion 24 between the axial bases 121 beyond control. Thereby in the following pivoting and operation of the outlet pipe 20, the mounting portion 23 on the inlet end 21 can be mounted and positioned in the insertion hole 111 of the valve seat 10 accurately and quickly so that assembly quality and efficiency are further improved.

Figure 9:
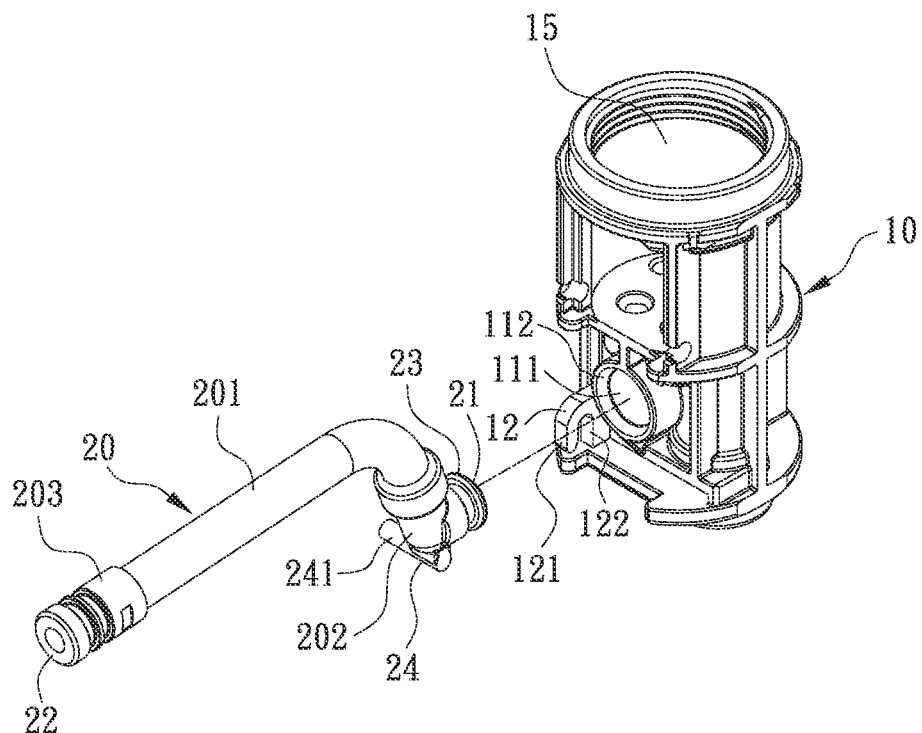
FIG. 9 is an exploded view of a further embodiment according to the present invention.

Refer to FIG. 9, a further embodiment is provided. The structure of this embodiment is similar to the first embodiment and a difference between the two embodiments is in that the first axial connection portion 12 of this embodiment includes only one axial base 121 while the first embodiment is provided with two symmetrical axial bases 121. That means the first axial connection portion 12 is provided with the axial base 121 disposed adjacent to the insertion hole 111. Similarly, the second axial connection portion 24 is only provided with one mounting segment 241 which is arranged at one side of the second axial connection portion 24 corresponding to the axial base 121 and able to be mounted into the corresponding axial slot 122 from bottom up to form the rotation point. Normally, such design can still allow the mounting portion 23 on the inlet end 21 to be mounted and positioned in the insertion hole 111 of the valve seat 10 effectively and assembly process is completed smoothly as expected in the following pivoting and operation of the outlet pipe 20.

Figure 10:
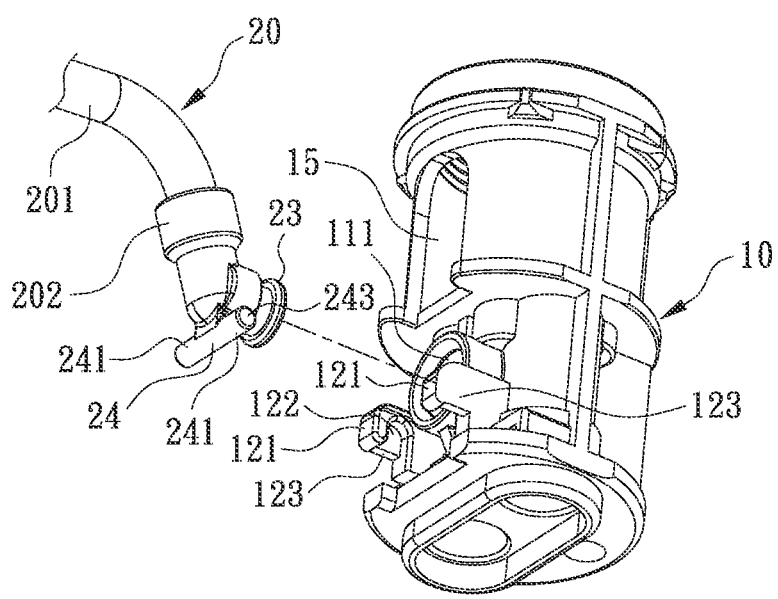
FIG. 10 is an exploded view of a fourth embodiment according to the present invention.
Figure 11:
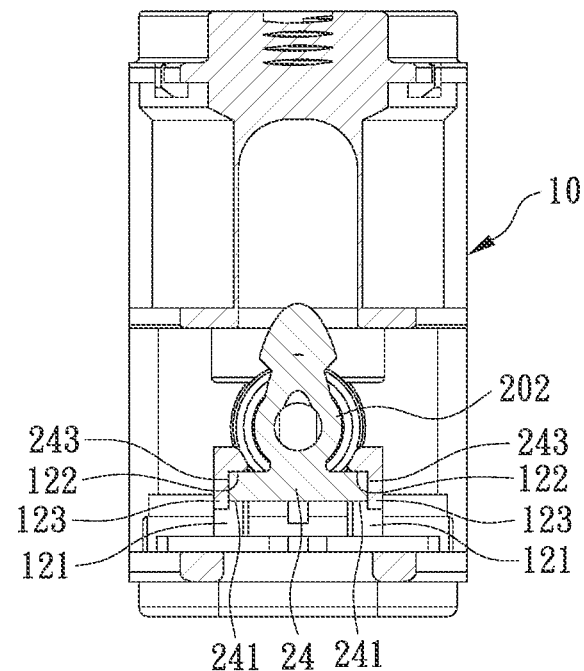
FIG. 11 is a sectional view of the fourth embodiment cut along a long axis of mounting segments according to the present invention.

Refer to FIG. 10 and FIG. 11, a fourth embodiment is provided. The structure of this embodiment is similar to the first embodiment and a difference therebetween is in that a stopping wall 123 is disposed on an outer side of the axial slot 122 of the first axial connection portion 12. Thus the mounting segments 241 on two lateral sides of the second axial connection portion 24 are mounted into the corresponding axial slots 122 from bottom up to form the rotation points. An edge 243 of the mounting segment 241 is stopped and limited by the corresponding stopping wall 123 of the axial base 121. Thereby horizontal movement of the second axial connection portion 24 between the axial bases 121 beyond control is limited. The design ensures the mounting portion 23 on the inlet end 21 can be mounted and positioned in the insertion hole 111 of the valve seat 10 accurately and quickly in the following pivoting and operation of the outlet pipe 20.

Figure 12:
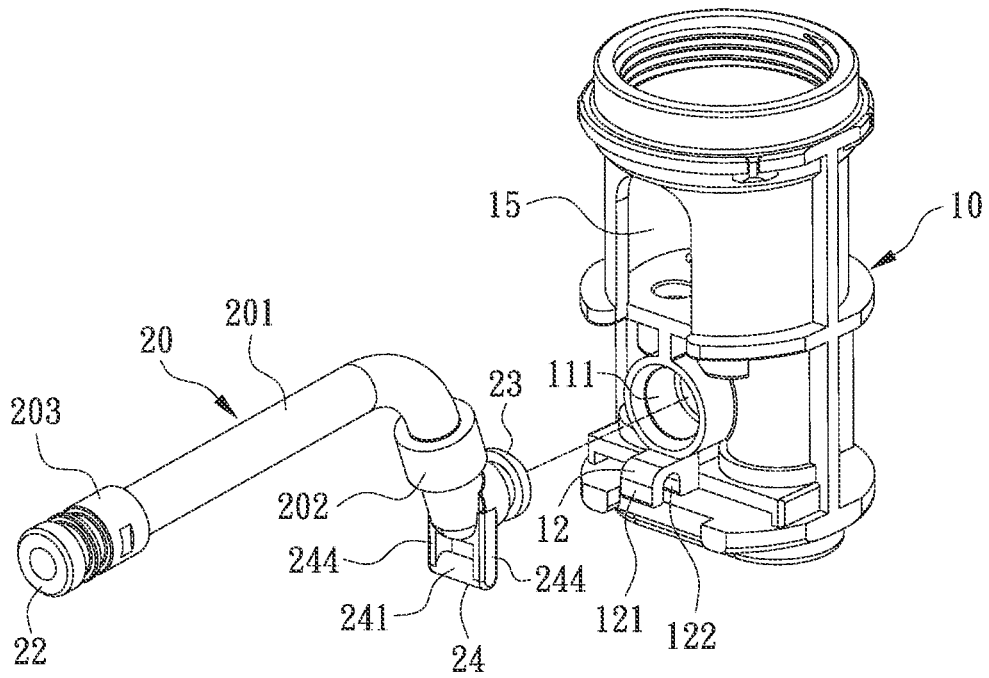
FIG. 12 is an exploded view of a fifth embodiment according to the present invention.
Figure 13:
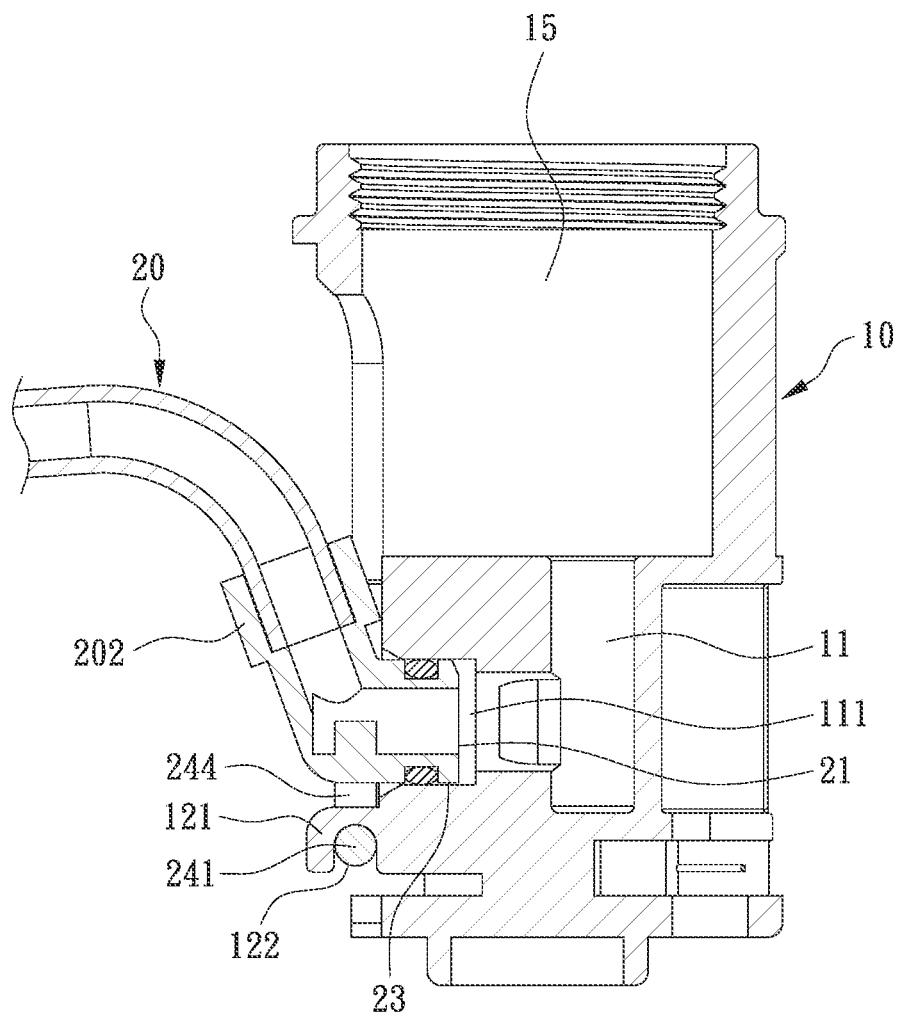
FIG. 13 is a sectional view of the fifth embodiment cut along a long axis of mounting segments according to the present invention.

Refer to FIG. 12 and FIG. 13, a fifth embodiment is provided. The structure of this embodiment is similar to the first embodiment and a difference between the first and the fifth embodiments is in that the first axial connection portion 12 of this embodiment includes only one axial base 121 (similar to the third embodiment) disposed just under the insertion hole 111 and the second axial connection portion 24 is provided with two connecting walls 244 symmetrically arranged at two lateral sides thereof and a mounting segment 241 located between and connected with the two connecting walls 244. The mounting segment 241 can also be mounted into the axial slot 122 from bottom up to form the rotation point. Two lateral wall surfaces of the axial base 121 and two opposite inner walls of the connecting walls 244 are designed to be just stopped and limited by each other. Thereby the second axial connection portion 24 is limited, without having uncontrollable horizontal movement in the axial base 121 and this is beneficial to the following assembly.

Figure 14:
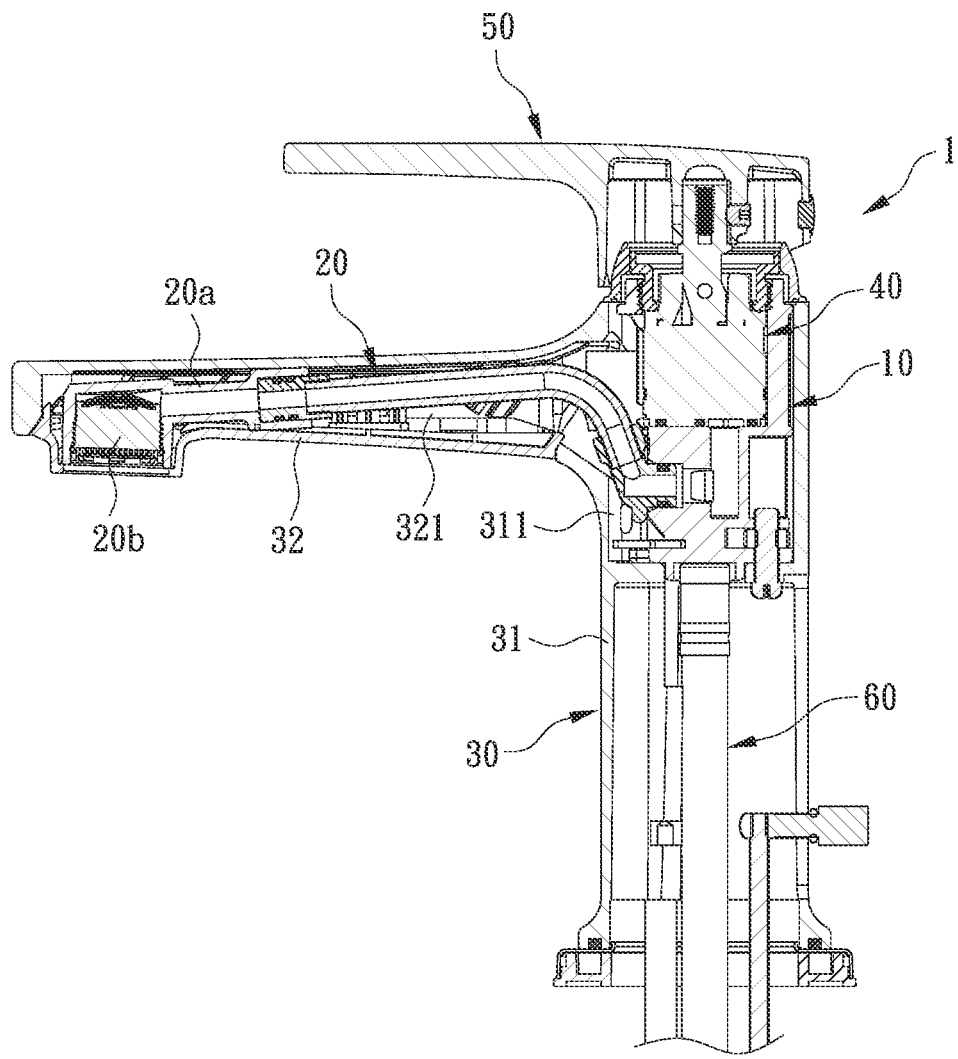
FIG. 14 is a longitudinal view of the first embodiment shown in FIG. 1-6 in which a valve seat is assembled with an outlet pipe to form a faucet according to the present invention.
Figure 15:
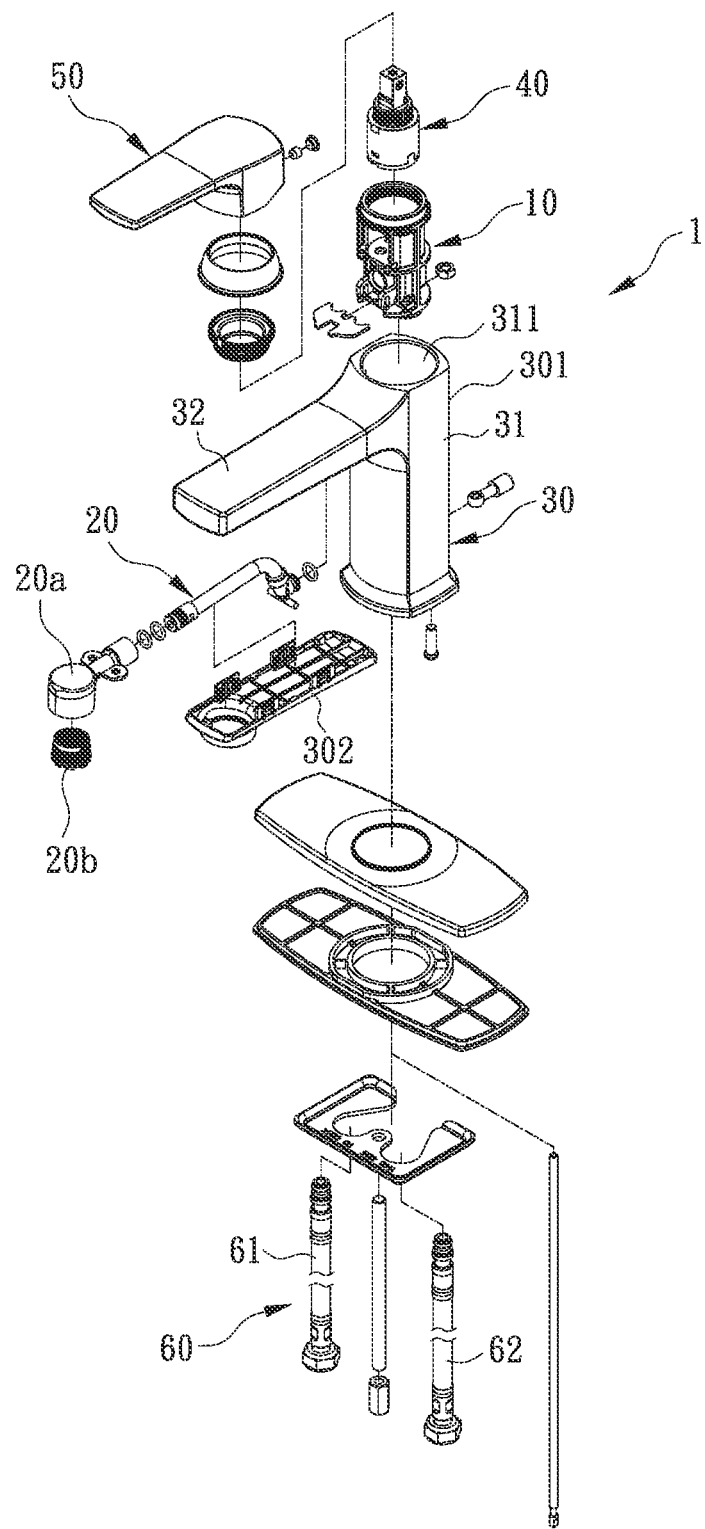
FIG. 15 is an exploded view of the faucet shown in FIG. 14 according to the present invention.

Refer to FIG. 14 and FIG. 15, the above embodiments of the connector assembly for connecting the valve seat 10 with the outlet pipe 20 are installed and applied to form a faucet 1. Take the first embodiment as an example, besides the valve seat 10 and the outlet pipe 20, the faucet 1 further includes a faucet housing 30, a valve core 40, a control handle 50, and a water supply pipe set 60. The faucet housing 30 consists of a main body 31 and a spout 32 respectively provided with a first chamber 311 and a second chamber 321 for mounting the valve seat 10 and the outlet pipe 20 therein correspondingly. The valve seat 10 further includes a cold-water inlet channel 13, a hot-water inlet channel 14, and a valve assembly space 15 (as shown in FIG. 1 and FIG. 2). The valve core 40 is mounted and positioned in the valve assembly space 15 on an upper part of the valve seat 10 and a ratio of cold water and hot water respectively coming from the cold-water inlet channel 13 and the hot-water inlet channel 14 and flowing into the valve core 40 can be controlled by operation of the control handle 50. The control handle 50 also controls on and off of a mixed water flow which is formed by mixing the hot water with cold water and flowing into the outlet channel 11. As to the water supply pipe set 60, it includes a cold-water inlet tube 61 and a hot-water inlet tube 62 respectively connected and communicating with the cold-water inlet channel 13 and the hot-water inlet channel 14.

It should be noted that the above connector assembly for connecting the valve seat 10 with the outlet pipe 20 is especially suitable to be mounted to the faucet housing 30 which includes at least two pieces of components. For example, the faucet housing 30 is formed by a body part 301 and a lower cover part 302 able to be detached from each other. The body part 301 forms the main body 31 and at least an upper half of the sprout 32 while the lower cover part 302 constitutes a lower half of the sprout 32. Thereby before the lower cover part 302 being mounted to the body part 301, the second axial connection portion 24 of the outlet pipe 20 can be mounted into the first axial connection portion 12 of valve seat 10 set in a certain depth of the body part 301 by a preset space of the body part 301 used for mounting the lower cover part 302. Then the valve seat 10 is positioned by downward movement and the outlet pipe 20 is forced to rotate around the rotation point during downward movement of the valve seat 10 since the outlet pipe 20 is stopped and limited in the body part 301. It should be understood easily that the mounting portion 23 on the inlet end 21 of the outlet pipe 20 can be mounted into the insertion hole 111 of the valve seat 10 automatically together with the movement of the valve seat 10 so as to achieve quick and easy assembly with effective sealing effect.

The outlet pipe 20 in the above embodiments can be used in combination with a terminal sleeve 20a used not only for mounting and positioning an aerator 20b but also for sealing and positioning the outlet joint 203 of the outlet pipe 20. The terminal sleeve 20a can be installed and positioned in the second chamber 321 of the faucet housing 30. For example, the terminal sleeve 20a is positioned between a space formed between the body part 301 and the cover component 302 so that the outlet end 22 of the outlet pipe 20 is further fixed. The design allows the outlet pipe 20 to be installed and positioned in the second chamber 321 of the faucet housing 30 easily and firmly.

The above two-piece type faucet housing 30 can also be formed by a body part 301 and an upper cover part able to be detached from each other. The body part 301 forms the main body 31 and at least a lower half of the sprout 32 while an upper half of the sprout 32 is formed by the upper cover part. It should be understood easily that the outlet pipe 20 is mounted into the body part 301 from top down since an opening of the upper cover part is facing upward, the same as the installation direction of the valve seat 10. Thereby the outlet pipe 20 is mounted to the valve seat 10 first and then installed into the body part 301 together with the valve seat 10. Next the upper cover part is mounted on the body part 301. The assembly is a bit different but the effect achieved is about the same.

In summary, the connector assembly for connecting the valve seat 10 with the outlet pipe 20 according to the present invention has the following features and functions.

The assembly of the valve seat 10 with the outlet pipe 20 requires no other components so that the whole structure is simple and fewer components are required. Thus cost of manufacturing and moldmaking is significantly reduced.

By the second axial connection portion 24 of the outlet pipe 20 being mounted into the first axial connection portion 12 of the valve seat 10 to form a rotation point and rotation of the outlet pipe 20 around the rotation point, the mounting portion 23 on the outlet pipe 20 can be mounted and positioned in the insertion hole 111 of the valve seat 10. The above design simplifies assembly process and reduces assembly steps significantly and further improves assembly efficiency.

By the structural design of the guiding flange 112 formed on the outer edge of the insertion hole 111 of the valve seat 10 in combination with the rim surface 231 arranged at the outer side of the mounting portion 23 of the outlet pipe 20, the mounting portion 23 is guided and mounted into the insertion hole 111 more smoothly while the outlet pipe 20 being rotated. Thereby smoothness of the assembly process and sealing effect after the assembly are balanced.

By different forms of the second axial connection portion 24 of the outlet pipe 20 for limiting horizontal movement of the second axial connection portion 24 after being mounted to the first axial connection portion 12 of the valve seat 10, it is ensured that the mounting portion 23 can be mounted into the insertion hole 111 accurately and quickly during rotation of the outlet pipe 20. The design also ensures both assembly efficiency and quality.

By the structural design of the mounting portion 23 being mounted into the insertion hole 111 after the outlet pipe 20 being rotated, the mounting portion 23 still provides resistance to loosening or slipping and maintains good sealing effect for a long term even subjected to water pressure. Thereby the loosening of the components or water leakage in use can be avoided.

By special design of assembly structure and operation between the valve seat 10 and the outlet pipe 20, the valve seat 10 used can be a single component. There is no need to use a two-piece type valve seat 10. The cost of manufacturing and moldmaking for the two-piece type valve seat 10 can be saved and corresponding assembly process can also be avoided.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A connector assembly for connecting valve seat with outlet pipe comprising a valve seat and an outlet pipe;

wherein the valve seat includes an outlet channel formed therein and a first axial connection portion; the outlet channel is provided with an insertion hole disposed on a discharge end of the outlet channel while the first axial connection portion is formed on an outer cylindrical wall of the valve seat and located below the insertion hole;

wherein the outlet pipe is composed of an inlet end, an outlet end, a mounting portion disposed on the inlet end, and a second axial connection portion which is arranged at an outer surface of the outlet pipe, located below the inlet end and close to the mounting portion; the second axial connection portion is detachably mounted into the first axial connection portion from bottom up to form a rotation point; by the outlet pipe rotated around the rotation point, the mounting portion is forced to be mounted and positioned inside the insertion hole of the valve seat firmly with sealing effect.

2. The connector assembly for connecting valve seat with outlet pipe as claimed in claim 1, wherein a guiding flange is mounted to an outer edge of the insertion hole and extending outward while a rim surface is formed on the outermost area of a rotation trace at an outer side of the mounting portion of the outlet pipe; the mounting portion is able to be guided and mounted into the insertion hole smoothly by the rim surface being moved along the guiding flange.

3. The connector assembly for connecting valve seat with outlet pipe as claimed in claim 1, wherein the first axial connection portion includes two axial bases arranged adjacent to the insertion hole symmetrically with the insertion hole located between the two axial bases, and two axial slots which are disposed on the axial bases correspondingly and extending vertically; the second axial connection portion is in a form of a shaft and provided with a mounting segment which is disposed on each of two ends of the second axial connection portion and able to be mounted into the corresponding axial slot from bottom up to form the rotation point.

4. The connector assembly for connecting valve seat with outlet pipe as claimed in claim 3, wherein the second axial connection portion further includes a stopping flange arranged adjacent to an inner side of the mounting segment for abutting against an inner wall surface of the axial base to limit horizontal movement of the second axial connection portion between the axial bases.

5. The connector assembly for connecting valve seat with outlet pipe as claimed in claim 1, wherein the first axial connection portion includes an axial base disposed adjacent to the insertion hole and an axial slots arranged at the axial base and extending vertically; the second axial connection portion is in a form of a shaft and provided with a mounting segment which is disposed on one end of the second axial connection portion corresponding to the axial base and able to be mounted into the axial slot from bottom up to form the rotation point.

6. The connector assembly for connecting valve seat with outlet pipe as claimed in claim 1, wherein the first axial connection portion includes two axial bases arranged adjacent to the insertion hole symmetrically with the insertion hole located therebetween, two axial slots each of which is disposed on the axial base and extending vertically, and two stopping walls disposed on an outer side of the axial slots correspondingly; the second axial connection portion is in a form of a shaft and provided with a mounting segment which is disposed on each of two ends of the second axial connection portion and able to be mounted into the corresponding axial slot from bottom up to form the rotation point; an edge of the mounting segment is stopped and limited by the corresponding stopping wall of the axial base.

7. The connector assembly for connecting valve seat with outlet pipe as claimed in claim 1, wherein the first axial connection portion includes an axial base disposed just under the insertion hole and an axial slot arranged at the axial base and extending vertically; the second axial connection portion is provided with two connecting walls symmetrically disposed on two lateral sides thereof and a mounting segment located between and connected with the two connecting walls and in a form of a shaft; the mounting segment is able to be mounted into the axial slot from bottom up to form the rotation point.

8. The connector assembly for connecting valve seat with outlet pipe as claimed in claim 1, wherein the outlet pipe further includes an outlet hose, and an inlet joint and an outlet joint which are fixed and connected with two ends of the outlet hose correspondingly; both the mounting portion and the second axial connection portion are integrally formed on the inlet joint.

9. A faucet comprising the valve seat and the outlet pipe as claimed in claim 1, a faucet housing, a valve core, a control handle, and a water supply pipe set; wherein the faucet housing consists of a main body and a spout respectively provided with a first chamber and a second chamber for mounting the valve seat and the outlet pipe therein correspondingly; wherein the valve seat further includes a cold-water inlet channel and a hot-water inlet channel; wherein the valve core is mounted and positioned on an upper part of the valve seat while a ratio of cold water and hot water respectively coming from the cold-water inlet channel and the hot-water inlet channel and flowing into the valve core is controlled by operation of the control handle; the control handle controls on and off of a mixed water flow which is formed by the hot water and the cold water and flowing into the outlet channel wherein the water supply pipe set includes a cold-water inlet tube and a hot-water inlet tube respectively connected and communicating with the cold-water inlet channel and the hot-water inlet channel.

10. The faucet as claimed in claim 9, wherein the faucet housing includes a body part and a lower cover part able to be detached from each other; the body part forms the main body and at least an upper half of the sprout while the lower cover part forms a lower half of the sprout; before assembly of the lower cover part, the second axial connection portion of the outlet pipe is mounted into the first axial connection portion of valve seat through the lower half of the sprout and the valve seat is positioned by downward movement; the outlet pipe is forced to rotate around the rotation point and the mounting portion of the outlet pipe is mounted into the insertion hole since the outlet pipe is stopped and limited in the body part.

\* \* \* \* \*